(12) United States Patent
Hansel et al.

(10) Patent No.: US 8,475,934 B2
(45) Date of Patent: Jul. 2, 2013

(54) FLAME-RETARDANT TIMBER MATERIALS

(75) Inventors: Jan-Gerd Hansel, Bergisch Gladbach (DE); Heiko Tebbe, Dormagen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 13/218,839

(22) Filed: Aug. 26, 2011

(65) Prior Publication Data
US 2012/0058358 A1   Mar. 8, 2012

(30) Foreign Application Priority Data
Sep. 7, 2010  (EP) .................................... 10175606

(51) Int. Cl.
*B32B 23/04* (2006.01)
(52) U.S. Cl.
USPC ......... 428/532; 428/536; 428/537.1; 427/325
(58) Field of Classification Search
USPC ...................... 428/532, 536, 537.1; 427/325
See application file for complete search history.

(56) References Cited

U.S. PATENT DOCUMENTS

| 2,725,311 A | 11/1955 | Kenaga et al. |
| 2,782,128 A | 2/1957 | Paist et al. |
| 3,157,613 A * | 11/1964 | Anderson et al. ............. 523/506 |
| 3,285,744 A | 11/1966 | Goldstein et al. |
| 3,285,774 A * | 11/1966 | Goldstein et al. ............. 427/397 |
| 3,558,596 A | 1/1971 | Demott et al. |
| 3,968,276 A | 7/1976 | Allen |
| 4,056,480 A | 11/1977 | Herber |
| 2007/0021516 A1 | 1/2007 | Hansel et al. |
| 2011/0108782 A1 | 5/2011 | Hansel et al. |

FOREIGN PATENT DOCUMENTS

| EP | 1746129 | * | 1/2007 |
| EP | 1982809 | * | 10/2008 |

OTHER PUBLICATIONS

Troitzsch, Jürgen, "Plastics Flammability Handbook" (contents), 2004, Carl Hanser Verlag, Munich.
Ostman, Birgit, "Fire and Materials", 2001, vol. 25, pp. 95-104.
LANXESS: "Neues Flamnischutzmittel von LANXEZZ fur Holz", Apr. 30, 2009, URL:http://lanxess.com/de/rubber-news/detail/1749/? tx_editfiltersystem_pil%5Bpointer%5D=21 (Feb. 7, 2011).
European Search Report from co-pending Application EP10175606 dated Feb. 8, 2011, 2 pages.

* cited by examiner

*Primary Examiner* — Leszek Kiliman
(74) *Attorney, Agent, or Firm* — Michael A. Miller

(57) ABSTRACT

The present invention relates to timber materials rendered flame-retardant by using halogen-free organophosphorus compounds, to means and processes for producing these materials, and also to their use.

8 Claims, No Drawings

FLAME-RETARDANT TIMBER MATERIALS

The present invention relates to timber materials rendered flame-retardant by using halogen-free organophosphorus compounds, to means and processes for producing these materials, and also to their use.

Wood and timber materials have to comply with extensive flame-retardancy requirements, as is and components also the case with other building and construction and materials used in construction and also for other purposes. By way of example, building and construction materials can be classified in accordance with DIN 4102, components for electrical equipment can be classified in accordance with UL 94 or IEC-60695-2, components for rail vehicles can be classified in accordance with DIN 5510, and furniture can be classified in accordance with BS 5852, and these can be rendered flame-retardant as required by their application. Particular requirements are placed by way of example on timber materials used in aircraft (e.g. FAR 25.853) or in ships (e.g. IMO A.652(16)). An overview of numerous tests and requirements is given by way of example in Jürgen Troitzsch, "Plastics Flammability Handbook", 2004, Carl Hanser Verlag, Munich.

Fire-protection requirements are also becoming ever more stringent. By way of example, new European standards which are intended to replace the national test standards applicable hitherto, contain significantly more stringent fire-protection requirements. By way of example, the SBI test (EN 13823) demands that attention be given not only to fire performance but also to smoke density. The new standard intended for rail vehicles (prEN 45545) by way of example considers smoke density and smoke toxicity. Requirements relating to smoke toxicity, which is often determined by measuring inter alia the concentrations of hydrogen halide in smoke, can by way of example make it impossible to use successful halogen-containing flame retardants. Another reason for preferring halogen-free flame retardants is that the public has more confidence in these in relation to product safety and protection of the environment. For many application sectors of timber products, a successful and effective method of providing flame retardancy therefore has to be modified in the light of new requirements.

It is known that timber materials can be rendered flame retardant via treatment with chemicals. The most important treatment methods are impregnation in pressure vessels and coating. A considerable disadvantage of flame-retardant coating of wood is that when the natural wood material is used in the construction sector or as furniture material it loses its typical natural appearance. Even if the coating is transparent, the effect on the appearance of the wood surface and on the possibilities for further processing is adverse, and this can be undesirable. Impregnation in a pressure vessel is therefore more frequently used, where the timber is brought into contact with a mostly aqueous solution of a flame retardant, and suitable measures are used to achieve absorption of a sufficient amount of flame retardant into the bulk of the timber, and this is finally dried. The flame retardants used comprise mainly phosphorus-, nitrogen- and boron-containing substances. Examples here are ammonium phosphate, urea and sodium tetraborate.

The provision of flame retardancy to timber via impregnation in a pressure vessel using salt-type flame retardants is an industrially established and inexpensive process, but has a number of disadvantages. Direct exposure to water, e.g. on the outer skin of buildings, leaches the flame retardants out of the material, and flame retardancy decreases. Flame retardants used in particular for exterior applications are therefore those that have been fixed within the wood and which cannot be leached out by water. Examples here are combinations of flame retardants with a resin which polymerizes to completion after impregnation within the wood and thus binds the flame retardant, as described in U.S. Pat. No. 3,968,276. As an alternative, as disclosed in U.S. Pat. No. 3,558,596, reactive flame retardants can be introduced into the wood, these being fixed via reaction with the wood.

However, even if there is no risk of direct contact with water, e.g. in the interior of buildings, the wood can be expected to become hygroscopic when conventional flame retardants are used, and this means that the equilibrium moisture level is increased. Results of this can be impaired dimensional stability of the wood components, corrosion of nails, screws and fittings, and also increased susceptibility to microbial attack. By way of example, *Fire and Materials* 2001, 25, 95-104 discloses that flame retardants based on diammonium hydrogenphosphate or urea, because which decompose wood.

Flame-retardant modification of wood can also have concomitant disadvantages in durability, glue adhesion and coatability of the wood. By way of example, reactive polyurethane-based systems for adhesion or for coating are unable to complete their reaction, or to complete their reaction to an adequate extent, if the pH of the substrate has been altered by the flame retardant. Flame-retardant modification can also impair mechanical stability.

Halogen-containing flame retardants have been proposed for wood in order to comply with stringent fire-protection requirements while the amounts used can be small, examples being halogenated phosphonates in U.S. Pat. No. 2,725,311 and halogenated phosphites and halogenated phosphates in U.S. Pat. No. 3,285,774. The halogen content provides good effectiveness. Disadvantages of these substances are high smoke densities and smoke toxicities in the event of a fire. Halogen-containing flame retardants moreover do not now comply with the requirements of society for product safety and protection of the environment.

Salt-type flame retardants based on ammonium salts of phosphoric acid, of polyphosphoric acids, or of substituted phosphonic acids are frequently used for the flame-retardant modification of wood. A disadvantage of these is that they can undesirably alter the nature, and the appearance, of the wood surface, for example via crystalline salt deposits which can occur when humidity changes, or via discoloration.

Boron compounds, such as sodium tetraborate, are also currently used as flame retardants for wood. However, the benefit provided with these is associated with a risk since they are classified as toxic for reproduction by the current EU Regulation (see Regulation (EC) No. 790/2009, p. 126). Now that the European Chemicals Agency ECHA has placed a number of boron compounds on the "Candidate List of Substances of Very High Concern (SVHC)" (ECHA press release ECHA/PR/10/12 of 18 Jun. 2010), the future use of these compounds is likely to suffer considerable restriction because of a requirement for authorization.

The strict requirements increasingly imposed by standards, the changes in public acceptance of certain chemicals, and the disadvantages described for the known flame retardant systems for timber materials lead to a requirement for novel solutions for the production of flame-retardant timber materials. The object of the present invention consists in discovering means and processes for the production of flame-retardant timber materials, where these exhibit high effectiveness and are based on a single-stage treatment using substances having good industrial-scale availability. The desired means should be free from halogen-containing substances, from inorganic phosphates and from boron compounds. They should have low volatility and minimize any increase in the water absorption of the timber. There should be no impairment of the natural appearance of the timber.

Surprisingly, it has been found that tetraalkyl bisphosphates permit easy production of flame-retardant timber materials which comply with all requirements. This invention provides flame-retardant timber materials comprising, as flame retardant, at least one tetraalkyl bisphosphate of the formula (I)

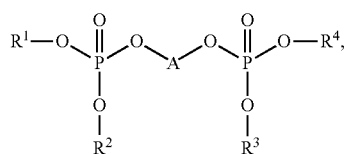

in which $R^1$, $R^2$, $R^3$, and $R^4$ are mutually independently a $C_1$-$C_8$-alkyl or $C_1$-$C_4$-alkoxyethyl moiety, A is a straight-chain, branched and/or cyclic $C_4$-$C_{20}$-alkylene moiety, a —$CH_2$—CH=CH—$CH_2$— group, a —$CH_2$—C≡C—$CH_2$— group, a —$CHR^5$—$CHR^6$—(O—$CHR^7$—$CHR^8$)$_a$— group, in which a is a number from 1 to 5, a —$CHR^5$—$CHR^6$—S(O)$_b$—$CHR^7$—$CHR^8$— group, in which b is a number from 0 to 2, or a —(CHR$^5$—CHR$^6$)$_c$—O—R$^9$—O—(CHR$^7$—CHR$^8$)$_d$— group, in which c and d are mutually independently numbers from 1 to 5, $R^5$, $R^6$, $R^7$, and $R^8$ are mutually independently H or methyl, $R^9$ is a —$CH_2$—CH=CH—$CH_2$— group, a —$CH_2$—C≡C—$CH_2$— group, a 1,2-phenylene moiety, a 1,3-phenylene moiety, a 1,4-phenylene moiety, a moiety of the general formula (II),

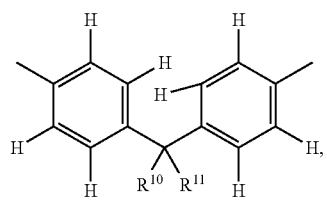

a moiety of the general formula (III),

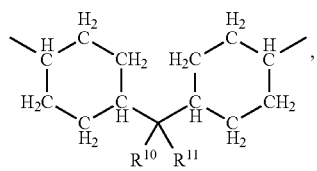

a moiety of the general formula (IV),

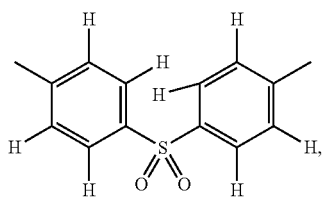

or a moiety of the formula —C(=O)—$R^{12}$—C(=O)—, $R^{10}$ and $R^{11}$ are mutually independently H or $C_1$-$C_4$-alkyl, or $R^{10}$ and $R^{11}$ together are an optionally alkyl-substituted ring having from 4 to 8 carbon atoms, and $R^{12}$ is a straight-chain, branched and/or cyclic $C_2$-$C_8$-alkylene moiety, a 1,2-phenylene moiety, a 1,3-phenylene moiety, or a 1,4-phenylene moiety.

For clarification, it should be noted that the scope of the invention encompasses any desired combinations of any of the definitions and parameters listed below in general terms or in preferred ranges.

It is preferable that $R^1$, $R^2$, $R^3$ and $R^4$ are identical and are a moiety from the group of ethyl, n-propyl, isopropyl, n-butyl and n-butoxyethyl.

It is preferable that A is a straight-chain $C_4$-$C_6$-alkylene moiety or is a group of the general formula (III), in which $R^{10}$ and $R^{11}$ are identical and are methyl, or is a group of the formulae (V), (VI) or (VII),

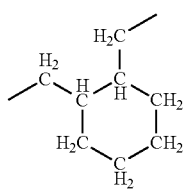

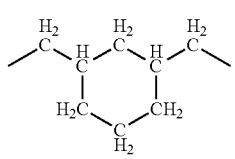

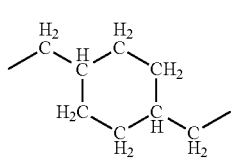

or that A is a —CHR$^5$—CHR$^6$—(O—CHR$^7$—CHR$^8$)$_a$— group, in which a is a number from 1 to 2 and $R^5$, $R^6$, $R^7$ and $R^8$ are identical and are H, or a —(CHR$^5$—CHR$^6$)$_c$—O—R$^9$—O—(CHR$^7$—CHR$^8$)$_d$— group, in which c and d are mutually independently a number from 1 to 2 and $R^9$ is a group of the general formula (II) and $R^{10}$ and $R^{11}$ are identical and are methyl.

It is particularly preferable that the present invention provides flame-retardant timber materials comprising, as flame retardant, at least one tetraalkyl bisphosphate from the group of diethylene glycol bis(di-n-butyl phosphate)=formula (VIII), diethylene glycol bis(di-n-propyl phosphate)=formula (IX), diethylene glycol bis(diethyl phosphate)=formula (X), 1,4-butanediol bis(di-n-propyl phosphate)=formula (XI), and 1,4-cyclohexanedimethanol bis(diethyl phosphate)= formula (XII).

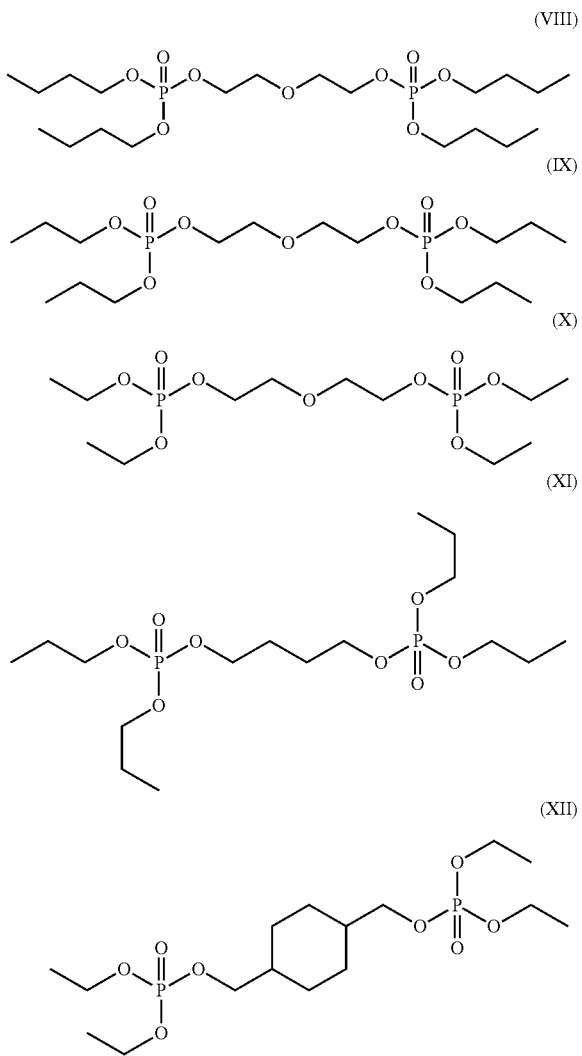

It is particularly preferable that the tetraalkyl bisphosphates of the general formula (I) are compounds which are liquid at temperatures of from 20 to 80° C. It is very particularly preferable that the tetraalkyl bisphosphates of the formula (I) can be dispersed or dissolved in water or another solvent.

With particular preference, the boiling point of the tetraalkyl bisphosphates of the formula (I) is above 200° C. at 1013 mbar.

Timber materials to be rendered flame-retardant in the context of the present invention are cut-to-size solid timber, e.g. debarked trunks, boards, beams, battens, sheets, layers, veneers, posts or bars, and also timber particles, such as shavings, chips, wood wool, sawdust or wood fibres, and finally materials or semifinished products produced from cut-to-size timber or from timber particles, e.g. plywood, laminates, chipboard and wood fibreboard.

Hardwood or softwood can be used to produce the timber materials to be rendered flame-retardant according to the invention. The following types of wood are particularly suitable: abachi, maple, birch, pear, bubinga, beech, Douglas fir, ebony, yew, oak, ash, alder, Eucalyptus, spruce, gaboon, chestnut, pine, cherry, larch, lime, mahogany, merbau, Meranti, walnut, palisander, poplar, plane, Robinia, fir, teak, elm, willow, Millettia and cedar, and also the respective subspecies and local varieties. Other suitable materials in the wider sense are woody and fibrous constituents of other plants, e.g. bamboo, sisal and hemp.

The timber materials to be rendered flame-retardant according to the invention can also comprise any desired mixture of the bisphosphates mentioned. The tetraalkyl bisphosphates can be produced by known methods. These use starting materials which are available on an industrial scale and which permit easy production of the desired final products. According to the invention, the tetraalkyl bisphosphates are halogen-free, and this means that they comprise no bonded atoms of F, of Cl, of Br or of I. However, during the industrial production of the said materials they may have been contaminated by halogen-containing impurities which are the cause of halogen content below 0.5% by weight.

The production of the compound (VIII) diethylene glycol bis(di-n-butyl phosphate), molar mass 491 g/mol, boiling point (1013 mbar): >200° C., CAS Reg. No. 62955-03-7, from diethylene glycol, phosphorus oxychloride and n-butanol is described in U.S. Pat. No. 4,056,480, Examples 1 and 2, column 7, lines 4-38.

The production of the compound of the formula (IX) diethylene glycol bis(di-n-propyl phosphate), molar mass 434 g/mol, boiling point (1013 mbar): >200° C., CAS Reg. No. 109598-81-4, from diethylene glycol, phosphorus trichloride, chlorine and n-propanol is described in U.S. Pat. No. 2,782,128, Example 1, column 2, line 47-column 3, line 21.

The compound of the formula (X) diethylene glycol bis (diethyl phosphate), molar mass 378 g/mol, boiling point (1013 mbar): >200° C., CAS Reg. No. 500347-73-9 can be produced by the process stated in U.S. Pat. No. 4,056,480 for producing the compound (VIII) with use of diethylene glycol, phosphorus oxychloride and ethanol.

Production of the compound of the formula (XI) 1,4-butanediol bis(di-n-propyl phosphate), molar mass 418 g/mol, boiling point (1013 mbar): >200° C., CAS Reg. No. 109441-43-2 from 1,4-butanediol, phosphorus trichloride, chlorine and n-propanol is described in U.S. Pat. No. 2,782,128, Example 3, column 3, line 35-column 4, line 3.

The compound of the formula (XII) 1,4-cyclohexanedimethanol bis(diethyl phosphate), molar mass 416 g/mol, boiling point (1013 mbar): >200° C., can be produced by the process stated in U.S. Pat. No. 4,056,480, column 8, lines 5-39 for producing 1,4-cyclohexanedimethanol bis(di-n-butyl phosphate), CAS Reg. No. 62955-05-9, with use of 1,4-cyclohexanedimethanol, phosphorus oxychloride and ethanol.

The timber materials to be rendered flame-retardant according to the invention can comprise not only the tetraalkyl bisphosphates of the formula (I) but also other flame retardants conventionally used for this purpose. For this, preference is given to salts of phosphoric acid with nitrogen-containing cations, in particular ammonium phosphate, salts of di- or polyphosphoric acid with nitrogen-containing cations, in particular ammonium polyphosphate, salts of substituted phosphonic acids, in particular tetraammonium 2-phosphonobutane-1,2,4-tricarboxylate, hydroxyfunctional esters of organic phosphonic acids, in particular 3-(dimethylphosphono)-N-(hydroxymethyl)propionamide, boron compounds, in particular sodium tetraborate, nitrogen compounds, in particular urea, melamine and guanidine derivatives, or silicon compounds, in particular silicones.

The timber materials to be rendered flame-retardant according to the invention are produced by treating optionally pretreated timber in the form of cut-to-size timber, timber particles or semifinished timber products with the tetraalkyl bisphosphates mentioned of the formula (I) in a manner known per se.

The invention also provides the use of tetraalkyl bisphosphates of the formula (I) for producing flame-retardant timber materials. In one preferred embodiment of the invention, the use of the tetraalkyl bisphosphates of the formula (I) in the invention takes place in a solvent or dispersion medium. The solvent or dispersion medium used comprises water, organic solvents, or a mixture made of water and of organic solvents. It is particularly preferable to use water as solvent or dispersion medium. The solutions or dispersions comprise concentrations of from 0.1 to 80% by weight of the tetraalkyl bisphosphates, based on the solution or dispersion, preferably from 1 to 40% by weight. The pH of the solutions or dispersions is from 1 to 12, preferably from 2 to 10. The solutions or dispersions can comprise other additions, preferably means for adjusting or regulating pH, antimicrobial timber preservatives, wetting aids or dispersing agents.

The invention also provides a process for rendering timber materials flame-retardant, characterized in that tetraalkyl bisphosphates according to the formula (I) are used to treat cut-to-size timber, timber particles or semifinished timber products.

In one preferred embodiment of the invention, during the treatment, the solutions or dispersions described above of the tetraalkyl bisphosphates mentioned in water or aqueous solvents are introduced into the wood via spraying, spreading, immersion or by impregnation in a pressure vessel, or via combinations of processes of this type. In contrast to the processes known from the prior art for surface-coating with a flame retardant, the tetraalkyl bisphosphates in this preferred embodiment of the invention are introduced into the bulk of the timber. This has the concomitant advantage that mechanical operations on the wood (e.g. sawing or sanding) do not cause loss of flame retardancy. It is particularly preferable that the treatment takes the form of impregnation in a pressure vessel.

The treatment can be carried out at atmospheric pressure, at subatmospheric pressure extending to 0.001 bar or at superatmospheric pressure extending to 50 bar. It is carried out at temperatures of from 0 to 150° C. The known variants of the impregnation process, namely the pressure-vessel process, the low-pressure process, the diffusion process, or trough immersion, can be used. The impregnation process can include subsequent drying of the timber material.

The cut-to-size timber, timber particles or semifinished timber products used in the process according to the invention can be treated while green or after predrying. They can have been pretreated in various ways, for example via kiln drying, pickling, bleaching, leaching to extract timber constituents, or antimicrobial treatment.

The cut-to-size timber, timber particles or semifinished timber products treated according to the invention can be further modified in subsequent operations in order to improve service properties such as resistance to water, weathering and UV radiation, resistance to microbes and insects, flame retardancy and dimensional stability or mechanical stability. For these purposes, they can be oiled, coated, painted, heat-treated, acetylated, silanized or furfurylated by methods known per se.

The timber materials according to the invention or the timber materials produced via means and processes according to the invention do not differ in terms of appearance and properties from untreated timber materials and can be further processed very successfully. High flame retardancy is achieved by the tetraalkyl bisphosphates used in the treatment process.

Finally, the invention also provides the use of the timber materials described as structural timber, preferably indoors, and particularly preferably in a roof-support structure, in ceiling structures and in wall structures, or as material for producing interior equipment, preferably in the form of ceiling cladding or of wall cladding or floor covering, or material for the production of furniture, of built-in cupboards, of exhibition stands and of shop fittings, or else material for the decorative internal fitting-out of means of transport, preferably automobiles, railway rolling stock, aircraft and ships, or starting material for semifinished timber products subjected to further finishing, preferably chipboard and wood fibreboard, or filler or reinforcing material in wood-containing composite materials, preferably wood-plastics composites or mineral-bound construction materials.

The examples below provide further explanation of the invention, but there is no intention that they restrict the invention. Percentages are percentages by weight.

EXAMPLES

A. Flame Retardancy

TABLE 1

Flame retardants used.

| Example | Flame retardant | Concentration [%] of aqueous solution |
|---|---|---|
| CE 1 | None | 0 |
| CE 2 | Tetrasodium 2-phosphonobutane-1,2,4-tricarboxylate | 15 |
| CE 3 | Diammonium hydrogenphosphate | 15 |
| IE 1 | Diethylene glycol bis(diethylphosphate) | 15 |

Production of Test Specimens

The fire test used test specimens made of pine timber (125 mm×40 mm×4 mm), sawn from commercially available laths. The test specimens were conditioned for 2 days at 23° C. and 50% humidity prior to treatment with the flame retardants. Their mass $m_1$ was then determined. They were then placed in an aqueous solution of the flame retardants of which the type and concentration is stated in Table 1. The immersion bath was evacuated down to a pressure of 50 mbar in a vacuum chamber, in which its residence time was 2 h at 23° C. Finally, air was admitted, and after 10 min the test specimens were taken out of the immersion bath, dabbed thoroughly dry, dried at 60° C. for 2 h and then conditioned for 2 days at 23° C. and 50% humidity and their mass $m_2$ was then determined. The flame retardant content in % stated in Table 2 corresponds to $(m_2-m_1)/m_2 \times 100$.

For comparison, corresponding test specimens were treated identically, except that, instead of a flame retardant solution, only deionized water was used (Comparative Example CE1).

Deionized water is characterized for the purposes of the present invention in that its conductivity is from 0.1 to 10 µS, where content of dissolved or undissolved metal ions is not greater than 1 ppm, preferably not greater than 0.5 ppm for Fe, Co, Ni, Mo, Cr, Cu as individual components, and not greater than 10 ppm, preferably not greater than 1 ppm, for the entirety of the metals mentioned.

Determination of Flame Retardancy

The specimens were fire-tested in a small-burner test. For this, the test specimens were clamped vertically and the lower edge thereof was exposed for 30 s to an ignition flame of length 2 cm. After removal of the ignition flame, an assessment was made as to whether the specimen self-extinguished, continued to burn or continued to smoulder. The length of the damaged area ("burn") was also determined. Table 2 lists the results.

TABLE 2

Results for Comparative Examples CE1, CE2 and CE3 and for Example IE1 according to the invention.

| Example | CE 1 | CE 2 | CE 3 | IE 1 |
|---|---|---|---|---|
| Flame retardant content [%] | 0 | 15 | 15 | 15 |
| Discoloration of test specimen | no | yellowish | no | no |
| Self-extinguishing after exposure to flame | no | yes | yes | yes |
| Continued smouldering | — | no | no | no |
| Burn [mm] | 125 | 75 | 45 | 50 |

Evaluation

The effectiveness of the tetraalkyl bisphosphate, in this case diethylene glycol bis(diethyl phosphate), to be used according to the invention as flame retardant for wood was apparent when Example IE1 according to the invention was compared with Comparative Example CE1 without flame retardant. As a result of treatment with a tetraalkyl bisphosphate, the wood test specimen became self-extinguishing and exhibited no afterglow. Effectiveness is almost as good as that of the established flame retardant diammonium hydrogenphosphate (Comparative Example CE3). In comparison with the tetrasodium 2-phosphonobutane-1,2,4-tricarboxylate of the prior art (Comparative Example CE2), the tetraalkyl bisphosphate is observed to give markedly less burn length, i.e. higher effectiveness, and also no discoloration.

B. Determination of Water Absorption

To measure water absorption, the test specimens (in each case 3 test specimens) made of pine timber treated with flame retardant (125 mm×40 mm×4 mm) were conditioned at 23° C. and 50% humidity to constant weight and then weighed ($m_i$). The test specimens were then stored for 7 days at 27° C. and 92% humidity. The specimens were weighed ($m_g$) and visually checked, and then dried at 103° C. in an oven to constant weight ($m_t$). Water absorption was calculated as follows from the mass values (in each case average from three test specimens):

$$U_i = (m_i - m_t)/m_t \times 100$$

$$U_g = (m_g - m_t)/m_t \times 100$$

$U_i$ here is the equilibrium moisture content under standard conditions, and $U_g$ is the equilibrium moisture content at elevated humidity ("tropical conditions"). Table 3 collates the test results.

TABLE 3

Water absorption results for Comparative Examples CE1, CE2 and CE3 and for Example IE1 according to the invention.

| Example | CE 1 | CE 2 | CE 3 | IE 1 |
|---|---|---|---|---|
| Flame retardant content [%] | 0 | 15 | 15 | 15 |
| Discoloration of test specimen | no | yellowish | no | no |
| Salt formation after drying | no | no | yes | no |
| $U_i$ [%] | 4.9 | 8.0 | 11.3 | 5.1 |
| $U_g$ [%] | 21.4 | 30.1 | 36.7 | 22.6 |

Evaluation

Alteration of water absorption of the timber due to treatment with a flame retardant should be minimized. Example IE1 according to the invention shows that tetraalkyl-bisphosphate-treated timber exhibits almost the same moisture content under standard conditions as timber without flame retardant (Comparative Example CE1). In contrast to this, under the said conditions, the two test specimens rendered flame-retardant by use of salts (Comparative Examples CE2 and CE3) exhibit markedly increased moisture content. Surprisingly, when conditions change to elevated humidity ("tropical conditions"), tetraalkyl-bisphosphate-treated timber (IE1) exhibits only insignificantly more moisture absorption than untreated timber (CE1), while the salt-type flame retardants (CE2 and CE3) cause considerably greater water absorption. Discoloration (CE2) or deposition of salts on the surface (CE3) was moreover observed when the salts were used but these were not observed when the flame retardant according to the invention was used.

It is thus clear that treatment according to the invention with tetraalkyl bisphosphates of the formula (I) leads to timber materials with pronounced flame retardancy. Treatment according to the invention does not alter the natural appearance of the wood surface. The timber materials also differ from the prior art in having particularly little susceptibility to water absorption.

What is claimed is:

1. Flame-retardant timber materials comprising, as flame retardant, at least one tetraalkyl bisphosphate of the formula (I)

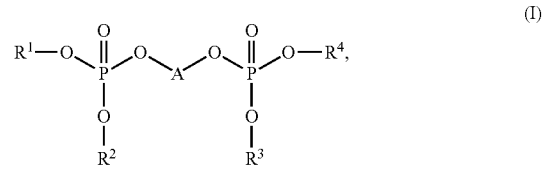

in which $R^1$, $R^2$, $R^3$, and $R^4$ are mutually independently a $C_1$-$C_8$-alkyl or $C_1$-$C_4$alkoxyethyl moiety, A is a straight-chain, branched and/or cyclic $C_4$-$C_{20}$-alkylene moiety, a —$CH_2$—CH=CH—$CH_2$— group, a —$CH_2$—C≡C—$CH_2$— group, a —$CHR^5$—$CHR^6$—(O—$CHR^7$—$CHR^8$)$_a$— group, in which a is a number from 1 to 5, a —$CHR^5$—$CHR^6$—S(O)$_b$—$CHR^7$—$CHR^8$— group, in which b is a number from 0 to 2, or a —($CHR^5$—$CHR^6$)$_c$—O—$R^9$—O—($CHR^7$—$CHR^8$)$_d$— group, in which c and d are mutually independently numbers from 1 to 5, $R^5$, $R^6$, $R^7$, and $R^8$ are mutually independently H or methyl, $R^9$ is a —$CH_2$—CH=CH—$CH_2$— group, a —$CH_2$—C≡C-$CH_2$— group, a 1,2-phenylene moiety, a 1,3-phenylene moiety, a 1,4-phenylene moiety, a moiety of the general formula (II), (II)

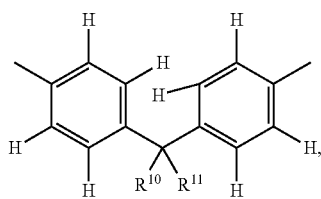

a moiety of the general formula (III), (III)

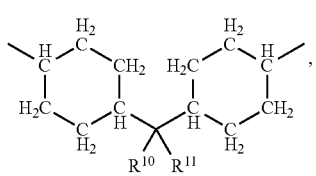

a moiety of the general formula (IV), (IV)

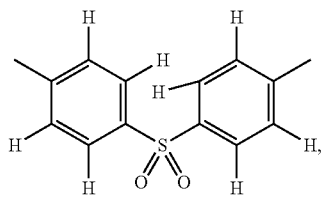

or a moiety of the formula —C(=O)—$R^{12}$—C(=O)—, $R^{10}$ and $R^{11}$ are mutually independently H or $C_1$-$C_4$-alkyl, or $R^{10}$ and $R^{11}$ together are an optionally alkyl-substituted ring having from 4 to 8 carbon atoms, and $R^{12}$ is a straight-chain, branched and/or cyclic $C_2$-$C_8$-alkylene moiety, a 1,2-phenylene moiety, a 1,3-phenylene moiety, or a 1,4-phenylene moiety.

2. Timber materials according to claim 1, characterized in that $R^1$, $R^2$, $R^3$ and $R^4$ are identical and are either ethyl, n-propyl, isopropyl, n-butyl or n-butoxyethyl.

3. Timber materials according to claim 1, characterized in that A is a straight-chain $C_4$-$C_6$-alkylene moiety or is a group of the general formula (III), in which $R^{10}$ and $R^{11}$ are identical and are methyl, or is a group of the formulae (V), (VI) or (VII), (V)

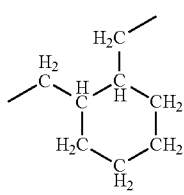

(VI)

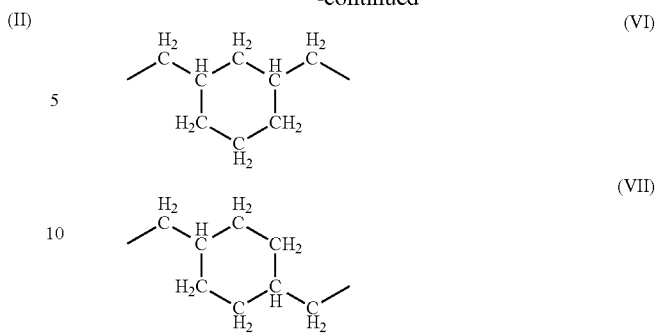

(VII)

or a —$CHR^5$—$CHR^6$—(O—$CHR^7$—$CHR^8$)$_a$— group, in which a is a number from 1 to 2 and $R^5$, $R^6$, $R^7$ and $R^8$ are identical and are H, or a —($CHR^5$—$CHR^6$)$_c$—O—$R^9$—O—($CHR^7$—$CHR^8$)$_d$— group, in which c and d are mutually independently a number from 1 to 2 and $R^9$ is a group of the general formula (II) and $R^{10}$ and $R^{11}$ are identical and are methyl.

4. Timber materials according to claim 1, characterized in that they comprise, as flame retardant, at least one tetraalkyl bisphosphate selected from the group of diethylene glycol bis(di-n-butyl phosphate), diethylene glycol bis(di-n-propyl phosphate), diethylene glycol bis(diethyl phosphate), 1,4-butanediol bis(di-n-propyl phosphate), and 1,4-cyclohexanedimethanol bis(diethyl phosphate).

5. Process for rendering timber materials flame-retardant, characterized in that at least one tetraalkyl bisphosphate of the formula (I)

(I)

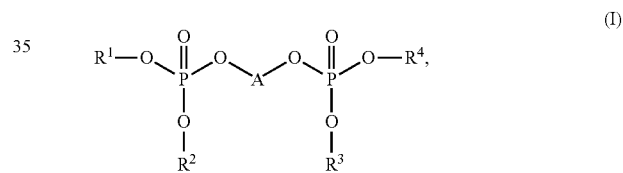

in which
the definitions of $R^1$, $R^2$, $R^3$, $R^4$ and A are as mentioned in claim 1,
is used to treat cut-to-size timber, timber particles or semi-finished timber products.

6. Process according to claim 5, characterized in that the treatment takes the form of impregnation in a pressure vessel, using solutions or dispersions of the tetraalkyl bisphosphates in water or in aqueous solvents.

7. Timber materials according to claim 1 wherein the timber materials are selected from the group consisting of structural timber, material for producing interior equipment, furniture or interior fittings of means of transport, material for semifinished timber products subjected to further finishing, and filler or reinforcing material in wood-containing composite materials.

8. Timber materials according to claim 7, wherein said timber materials are timber particles and used as filler or reinforcing material in wood-plastics composites.

* * * * *